United States Patent [19]

Chen

[11] Patent Number: 5,286,374
[45] Date of Patent: Feb. 15, 1994

[54] PROCESS FOR CRACKING WASTE RUBBER TIRES

[76] Inventor: Huang-Chuan Chen, c/o Hung Hsing Patent Service Center P.O. Box 55-1670, Taipei (10477), Taiwan

[21] Appl. No.: 23,129
[22] Filed: Feb. 26, 1993
[51] Int. Cl.$^5$ .................. C10G 1/10; C10G 11/02; B01J 21/12; B01J 21/14
[52] U.S. Cl. .................. 208/400; 208/118; 208/122; 208/419; 201/25; 44/628; 502/213; 502/242; 502/263
[58] Field of Search .......... 208/400, 118, 419, 122; 201/25; 44/628; 502/213, 242, 263

[56] References Cited

U.S. PATENT DOCUMENTS

| | | |
|---|---|---|
| 4,038,152 | 7/1977 | Atkins .................. 208/102 |
| 4,284,616 | 8/1981 | Solbakken et al. .......... 201/25 |
| 4,740,270 | 4/1988 | Roy .......................... 201/25 |
| 4,746,406 | 5/1988 | Timmann .................... 201/25 |
| 4,839,151 | 6/1989 | Apffel ......................... 201/3 |
| 5,061,363 | 10/1991 | Farcasiu et al. .......... 208/419 |
| 5,158,983 | 10/1992 | Stapp ........................ 208/18 |
| 5,167,772 | 12/1992 | Parker, Sr. ............... 201/25 |

*Primary Examiner*—R. Bruce Breneman
*Assistant Examiner*—Patricia L. Hailey

[57] ABSTRACT

An economic and safe process includes a catalytic cracking of the rubber tires and rubber products in the presence of mica catalyst selected from muscovite, sericite and biotite at a reaction temperature of 230°–400° C. under a pressure of 1–2.5 atmospheres for forming mixed oils, carbon black, gaseous products, and other residual products.

2 Claims, 1 Drawing Sheet

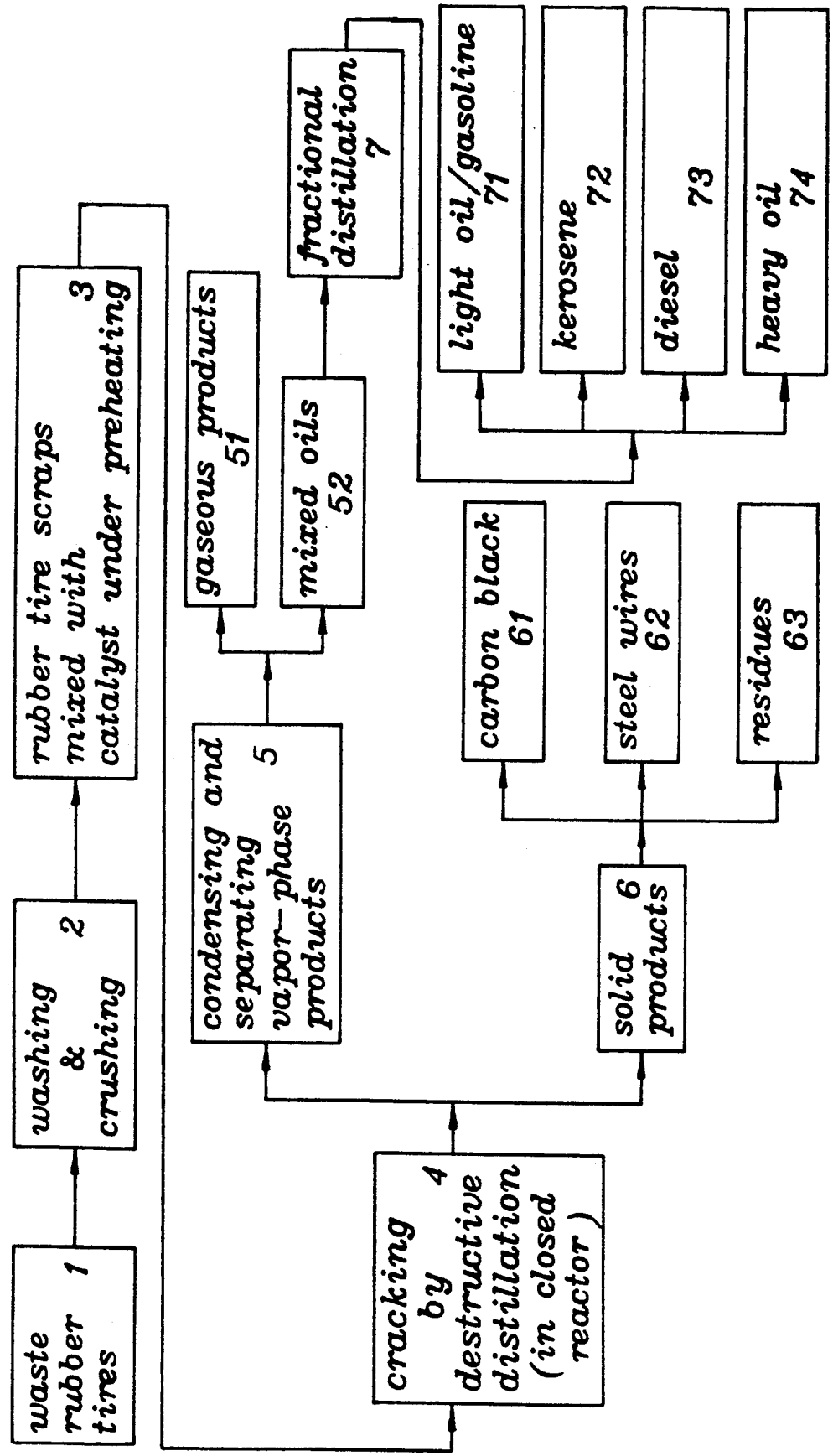

PROCESS FOR CRACKING WASTE RUBBER TIRES

BACKGROUND OF THE INVENTION

Conventional waste tires may be crushed or pulverized for producing reclaimed rubber which is used in limited proportions as an extender to lower the cost of rubber products. It may be somewhat deleterious to the final physical properties of the rubber product, but it aids in the processing because it flows and extrudes readily. However, the reclaimed rubber generally accounts for a low percentage such as about 10% of rubber consumption in the United States. For environmental protection, it is necessary to treat the waste rubber tires not used in the above-mentioned reclaiming processes.

Several conventional cracking processes are therefore applied for treating the rapidly growing waste rubber tires for producing fuel oils and gases by cracking the waste rubber tires, of which a conventional process discloses a cracking reaction conducted at a high temperature of more than 1000° C. under a high pressure of 3-30 kilograms per square-centimeter. However, such a conventional cracking process for cracking waste rubber products at high temperature and pressure may have the following drawbacks:

1. A high initial cost is required for installing the high pressure vessel at higher reaction temperature.
2. Since many flammable gaseous products, such as: hydrogen, low-carbon hydrocarbon gases including methane, ethane, propane, butane, isobutane, butene, etc., may be produced during the cracking process, such flammable gases produced from the high temperature, high pressure reactor will be very dangerous or hazardous to the working environment in view of industrial safety factor. For instance, the hydrogen gas has an ignition temperature of 1085° F. (585° C.); methane of 999° F. (537° C.); ethane of 959° F. (515° C.), etc. They are all flammable, or easily explosive once leaked from the high-temperature cracking reactor and should be handled or treated very carefully, thereby increasing operation complexity and cost therefore.
3. It will consume much energy to conduct the cracking reaction at higher temperature, thereby wasting valuable energy resources.

It is therefore expected to disclose a process for cracking waste rubber tires at lower temperature and pressure.

SUMMARY OF THE INVENTION

The object of the present invention is to provide an economic and safe process for cracking waste rubber tires and rubber products by catalytic cracking of the rubber tires and rubber products in the presence of a mica catalyst selected from muscovite, sericite and biotite at a reaction temperature of 230°-400° C. under a pressure of 1-2.5 atmospheres to form oils, carbon black, gaseous products, and other residual products.

BRIEF DESCRIPTION OF THE DRAWINGS

The single drawing figure shows a process flow sheet for cracking waste rubber tires in accordance with the present invention.

DETAILED DESCRIPTION

As shown in the single drawing figure, the present invention comprises a process for cracking waste rubber tires and rubber products by the following procedures:

a. Washing the waste rubber tires or the like (1) such as by water washing (2); (Note: The "waste rubber tires or the like" may include used tires, any kind of rubber tires, inner tubes, and other rubber products, etc.)

b. Crushing (2) the washed waste rubber tires into rubber scraps or chips having a size of about 5 cm × 5 cm per piece;

c. Mixing (3) the rubber scraps with pulverized catalyst of micas in a mixer and preheating the mixture to 210° C.;

d. Cracking (4) the mixed rubber scraps with micas catalyst in a closed reactor for performing destructive distillation under heating to keep a temperature ranging from 230° C. to 400° C. and under a pressure of 1-2.5 atmospheres. The cracking reaction is started at 230° C., while the cracking proceeds rapidly and vigorously at 350° C. The maximum reaction temperature may reach up to 400° C. The pressure 1-2.5 atm. is a systematic reaction pressure created in situ in the reactor by the gases produced during the cracking reaction, without being blanketed by any inert gas such as nitrogen gas in the reactor;

e. Condensing and separating the vapor-phase products (5) into gaseous products (51) and mixed oils (52) which may be further separated by fractional distillation (7), into oils including: light oil and gasoline (71), kerosene (72), diesel oil (73) and heavy oil (74); and f. Separating the solid products (6) from the cracking step (4) into carbon black (61), steel wires (62), and other residue products (63).

The mica catalyst used in this invention may be selected from: muscovite, sericite, and biotite. Sericite is preferably used in this invention.

Sericite has a chemical formula of $KAl_2(AlSiO_3O_{10})(OH)_2$, with the following chemical composition (100% by weight):

| | |
|---|---|
| $SiO_2$ | 47.65 |
| $Al_2O_3$ | 37.03 |
| $K_2O$ | 9.02 |
| $TiO_2$ | 0.10 |
| $Fe_2O_3$ | 0.01 |
| $MgO$ | 0.04 |
| $Na_2O$ | 0.76 |
| $H_2O$ | 0.73–4.97 |
| $P_2O_5$ | 0.02 |
| FeO, MnO and CaO | Trace |

The catalyst quantity used in this invention is 2-3% by weight based on 100% of waste rubber tires and products.

The mixed oil products includes: light oil, gasoline, kerosene, diesel, and heavy oil, and may be directly served as fuel oil without further fractionation. However, if necessary, the mixed oils may be further separated into each specific oil by fractional distillation.

The gaseous products include hydrogen, hydrocarbons of low carbon atoms including methane, propane, butane and butene, carbon monoxide, carbon dioxide, and trace of other products or sulfur product. The sulfur product is present because sulfur was added during the vulcanization of rubber tires manufacturing. The gaseous products can also be used as a fuel. However, the isobutylene and butylene primarily existing in the gaseous products may be further isolated for industrial use, such as for producing butyl rubber.

The waste rubber tires may be selected from rubber tires having steel wires lined in the tires, inner tubes of tires, or other waste rubber products including natural and synthetic rubbers. If steel-belted rubber tires are treated in this invention, steel wires may be produced in the solid products after destructive distillation of the reactants.

The present invention will be further described in detail in the follow examples:

EXAMPLE 1

In a 32 liters autoclave provided with intermittently operating agitator, 6680 grams of crushed inner tubes of rubber tires (scraps, each of 5 cm×5 cm) and 150 grams of sericite catalyst were added. The autoclave is gradually heated to a temperature of 230° C. for starting the cracking reaction. The reaction temperature is kept in the range of 230°–400° C. under a closed systemic pressure of 1–2.5 atm. (absolute pressure) for one hour.

After finishing the cracking process, a plurality of products are obtained as shown in Table 1.

TABLE 1

| Products | Weight (grams) | weight, % |
| --- | --- | --- |
| Gaseous products | 1400 | 21 |
| Mixed oils | 2280 | 34 |
| Carbon black and residue | 2850 | 43 |
| Water | 150 | 2 |

The mixed oils are further treated with fractional distillation to produce each specific oil as listed on Table 2.

TABLE 2

| Oil (Distillation Temperature range) | Weight (grams) | Weight, % |
| --- | --- | --- |
| Light Oil, 50-186° C. (fractional distillation at normal pressure) | 370 | 16 |
| Gasoline, 140–156° C. (under vacuum, 500 mm Hg) | 376 | 16.6 |
| Kerosene, 156∝180° C. (500 mm Hg Vac.) | 310 | 14 |
| Diesel, 180–200° C. (500 mm Hg Vac.) | 810 | 36 |
| Heavy Oil | 385 | 17.4 |

The gaseous products are analyzed and identified to have a composition as shown in Table 3.

TABLE 3

| Gases | 100%, Percentage by volume |
| --- | --- |
| Hydrogen | 12 |
| Methane | 20.59 |
| Ethane | 4.42 |
| Ethylene | 1.07 |
| Propane | 2.85 |
| Propylene | 1.66 |
| iso-butane | 5.13 |
| iso-butylene and Butylene-1 | 45.3 |
| Butylene-2 | 0.04 |
| n-pentane | 0.15 |
| Pentylene | 0.49 |
| $CO_2$ | 4.54 |
| CO | 1.65 |

The iso-butylene and butylene-1 has a volume percentage of 45.3 base don the total gaseous products, which can be further isolated to be valuable industrial products.

EXAMPLE 2

Repeat the procedures as shown in Example 1 by substituting the inner tubes of rubber tires with steel belted rubber tires, the crushing products are obtained a shown in Table 4, wherein the results obtained from Example 1 are listed for comparison.

TABLE 4

| Products | Example 2 | Example 1 |
| --- | --- | --- |
| Gaseous products | 12% | 21% |
| Mixed Oils | 50% | 34% |
| Carbon black and residue | 32% | 43% |
| Water | 2% | 2% |
| Steel wires | 4% | — |

From the data as listed in Table 4, the steel belted rubber tires (having steel wires) will produce more oils, but less gaseous products, than that as cracked from the inner tubes of tires (without steel wires).

Comparatively, the fractionated oils further separated from the "mixed oils" either in Example 1 or 2 are almost equal in composition (weight) percentage as shown in Table 5, indicating that the cracking products obtained from the process of the present invention can provide stable and useful fuels. Therefore, the present invention may enhance the reuse of energy resources for preventing wasting of rubber tires, since the rubber tires are convertible to be useful and valuable fuel oils, gaseous products and carbon black.

TABLE 5

| Oils | Example 1 | Example 2 |
| --- | --- | --- |
| Light oil/gasoline | 32.6 | 33 |
| Kerosene | 14 | 15.5 |
| Diesel | 36 | 35 |
| Heavy Oil | 17.4 | 16.5 |

Accordingly, this invention provides a cracking process for treating waste rubber tires to produce useful products with the following advantages superior to conventional rubber cracking processes:

1. Cracking is performed at low temperature and low pressure for a safer reaction condition. For example, the maximum reaction temperature, 400° C., is much lower than the ignition temperature of hydrogen, methane, and ethane as aforementioned, providing a safer condition.
2. Low installation, operation and maintenance cost and low energy consumption will be effected by this invention because of its low temperature and pressure reaction conditions.
3. Air pollution can be effectively prevented since the lower reaction pressure will minimize the possibility of gas leakage of the dangerous gases from the reactor and process system.

The present invention may be modified without departing from the spirit and scope as claimed in this invention. Other polymers of high molecular weight can also be cracked by using the process as described in this invention.

Another patent application for claiming the detailed process equipment of the present invention will be later filed by the same applicant of this invention.

I claim:

1. A process for cracking waste rubber tires comprising:
   a. washing and crushing waste rubber tires into rubber scraps;
   b. mixing the rubber scraps with mica catalyst selected from the group consisting of muscovite, sericite and biotite under heating to 210° C.;
   c. performing a cracking reaction with destructive distillation of the rubber scraps in the presence of the mica catalyst comprising a catalyst quantity of 2-3% by weight based on 100% of total waste rubber tires fed in the cracking reaction under heating to maintain a temperature ranging from 230° C. to 400° C. under a pressure of 1 atmosphere to 2.5 atmospheres for one hour to produce cracking products of vapor-phase products containing gases and mixed oils, and solid products containing carbon black and residual products; and
   d. separating the cracking products into gases, mixed oils, carbon black and residual products.

2. A process according to claim 1, wherein said mica catalyst is a sericite powder.

* * * * *